(12) United States Patent
Ben-Rubi

(10) Patent No.: US 12,164,775 B2
(45) Date of Patent: Dec. 10, 2024

(54) DATA STORAGE DEVICE THAT DETECTS AND RELEASES BOTTLENECKS IN HARDWARE

(71) Applicant: Western Digital Technologies, Inc., San Jose, CA (US)

(72) Inventor: Refael Ben-Rubi, Rosh Haayin (IL)

(73) Assignee: Sandisk Technologies, Inc., Milpitas, CA (US)

( * ) Notice: Subject to any disclaimer, the term of this patent is extended or adjusted under 35 U.S.C. 154(b) by 162 days.

(21) Appl. No.: 17/958,594

(22) Filed: Oct. 3, 2022

(65) Prior Publication Data
US 2024/0111426 A1 Apr. 4, 2024

(51) Int. Cl.
*G06F 3/06* (2006.01)
*G06F 9/52* (2006.01)

(52) U.S. Cl.
CPC .......... *G06F 3/0613* (2013.01); *G06F 3/0631* (2013.01); *G06F 3/0659* (2013.01); *G06F 3/0679* (2013.01); *G06F 9/524* (2013.01)

(58) Field of Classification Search
CPC .... G06F 3/0613; G06F 3/0631; G06F 3/0659; G06F 3/0679; G06F 9/524; G06F 3/0635; G06F 3/0653; G06F 3/0688; G06F 3/061
See application file for complete search history.

(56) References Cited

U.S. PATENT DOCUMENTS

| | | | |
|---|---|---|---|
| 9,626,286 B2 | 4/2017 | Gorobets et al. | |
| 10,698,610 B2 | 6/2020 | Yang | |
| 11,126,367 B2 | 9/2021 | Benisty | |
| 12,046,321 B2 * | 7/2024 | Liu | G11C 11/4063 |
| 2005/0188109 A1 * | 8/2005 | Shiga | H04L 47/10 709/239 |
| 2006/0187836 A1 * | 8/2006 | Frey | H04L 47/32 370/235 |

(Continued)

FOREIGN PATENT DOCUMENTS

CN 111580639 A 8/2020

OTHER PUBLICATIONS

Kim, et al., SSD Performance Modeling Using Bottleneck Analysis, 2017, in IEEE Computer Architecture Letters, vol. 17, No. 1, Dec. 4, pp. 80-83. IEEE.

*Primary Examiner* — Sean D Rossiter
(74) *Attorney, Agent, or Firm* — PATTERSON + SHERIDAN, LLP

(57) ABSTRACT

A data storage device includes a memory device and a controller coupled to the memory device. The controller is configured to receive a read command to read data from the memory device or a write command to write data to the memory device from a host device, determine whether a bottleneck exists in a data/control path between the host device and the memory device, wherein the bottleneck exists in a hardware module of the plurality of hardware modules, and execute a bottleneck release operation when the bottleneck exists in the data/control path between the host device and the memory device, wherein the bottleneck release operation is dependent on whether the bottleneck exists in the input queue. The bottleneck release operation includes changing a clock of the hardware module, moving the command to a different hardware module configured to process the command, and combinations thereof.

12 Claims, 6 Drawing Sheets

(56) References Cited

U.S. PATENT DOCUMENTS

| | | | |
|---|---|---|---|
| 2013/0121340 A1* | 5/2013 | Papadimitriou | H04L 45/02 370/410 |
| 2018/0046686 A1* | 2/2018 | Kobayashi | G06F 3/0605 |
| 2021/0141559 A1 | 5/2021 | Kim et al. | |
| 2023/0195336 A1* | 6/2023 | Togo | G06F 3/0604 711/154 |
| 2024/0053890 A1* | 2/2024 | Rubi | G06F 3/0653 |

* cited by examiner

DATA STORAGE DEVICE THAT DETECTS AND RELEASES BOTTLENECKS IN HARDWARE

BACKGROUND OF THE DISCLOSURE

Field of the Disclosure

Embodiments of the present disclosure generally relate to data storage devices, such as solid state drives (SSDs), and, more specifically, efficient detection and release of hardware module bottlenecks in a data storage device.

Description of the Related Art

A data storage device may store data for a host device, where the host device is coupled to the data storage device. When the host device generates a write command, the host device rings a doorbell of a controller of the data storage device, where the controller fetches the write command and data associated with the write command. The write command and the data associated with the write command are processed through a plurality of hardware modules and the data associated with the write command is eventually programmed to a memory device of the data storage device. Likewise, when the host generates a read command, the host device rings a doorbell of a controller of the data storage device, where the controller fetches the read command. The read command is processed by a plurality of hardware modules and the relevant data is retrieved from the memory device. The retrieved relevant data is then processed by a plurality of hardware modules and the retrieved relevant data is eventually provided to the host device.

The speed at which the read command and the write command are completed, which may include time between receiving the doorbell and sending a completion message/interrupt message to the host device indicating that the read command or the write command is completed, corresponds to a read performance and a write performance, respectively. However, not all hardware modules and/or transfer busses can process data or commands at the same speed. Likewise, a queue length of each hardware module may differ and limit an amount of data or commands that may be queued for the corresponding hardware module. Thus, bottlenecks in a data/control path between a host device and a memory device of a data storage device may arise due to the inequality of processing power, queue length, and the like of the hardware modules in the data/control path, which may cause a decrease in overall read performance, overall write performance, and/or overall data storage device performance.

Therefore, there is a need in the art for an efficient hardware module bottleneck detection and release operation in a data storage device.

SUMMARY OF THE DISCLOSURE

The present disclosure generally relates to data storage devices, such as solid state drives (SSDs), and, more specifically, efficient detection and release of hardware module bottlenecks in a data storage device. A data storage device includes a memory device and a controller coupled to the memory device. The controller is configured to receive a read command to read data from the memory device or a write command to write data to the memory device from a host device, determine whether a bottleneck exists in a data/control path between the host device and the memory device, wherein the bottleneck exists in a hardware module of the plurality of hardware modules, and execute a bottleneck release operation when the bottleneck exists in the data/control path between the host device and the memory device, wherein the bottleneck release operation is dependent on whether the bottleneck exists in the input queue or in the hardware module. The bottleneck release operation includes changing a clock of the hardware module, moving the command to a different hardware module configured to process the command, and combinations thereof.

In one embodiment, a data storage device includes a first hardware module, a second hardware module coupled to the first hardware module, a third hardware module coupled to the first hardware module, and a controller coupled to the first hardware module, the second hardware module, and the third hardware module. The controller is configured to receive a command, wherein contents of the command are scheduled to be transferred to the second hardware module from the first hardware module, detect that the second hardware module has a bottleneck occurring, change the transfer location of the command from the second hardware module to the third hardware module, wherein changing the transfer location causes the contents of the command to be scheduled to be transferred to third hardware module from the first hardware module, and transfer the command from the first hardware module to the third hardware module.

In another embodiment, a data storage device includes a first hardware module, a second hardware module coupled to the first hardware module, a third hardware module coupled to the first hardware module, and a controller coupled to the first hardware module, the second hardware module, and the third hardware module. The controller is configured to receive a command, wherein contents of the command are scheduled to be transferred to the second hardware module from the first hardware module, detect that the second hardware module has a bottleneck occurring, adjust an operating parameter of the second hardware module in response to the bottleneck, and transfer the command from the first hardware module to the second hardware module.

In another embodiment, a data storage device includes memory means and a controller coupled to the memory means. The controller is configured to receive a write command to write data to the memory means or a read command to read data from the memory means, determine that there is a bottleneck in a hardware module in a data/control path between a first hardware module and the memory means, wherein the data/control path comprises at least the first hardware module and a plurality of second hardware modules and each second hardware module of the plurality of second hardware modules are coupled to the first hardware module, perform a bottleneck release operation associated with the bottleneck in the hardware module, and execute the write command or the read command based on the bottleneck release operation performed.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, efficient detection and release of hardware module bottlenecks in a data storage device. A data storage device includes a memory device and a controller coupled to the memory device. The controller is configured to receive a read command to read data from the memory device or a write command to write data to the memory device from a host device, determine whether a bottleneck exists in a data/control path between the host device and the memory device, wherein the bottleneck exists in a hardware module of the plurality of hardware modules, and execute a bottleneck release operation when the bottleneck exists in the data/control path between the host device and the memory device, wherein the bottleneck release operation is dependent on whether the bottleneck exists in the input queue or in the hardware module. The bottleneck release operation includes changing a clock of the hardware module, moving the command to a different hardware module configured to process the command, and combinations thereof.

Figure 1:
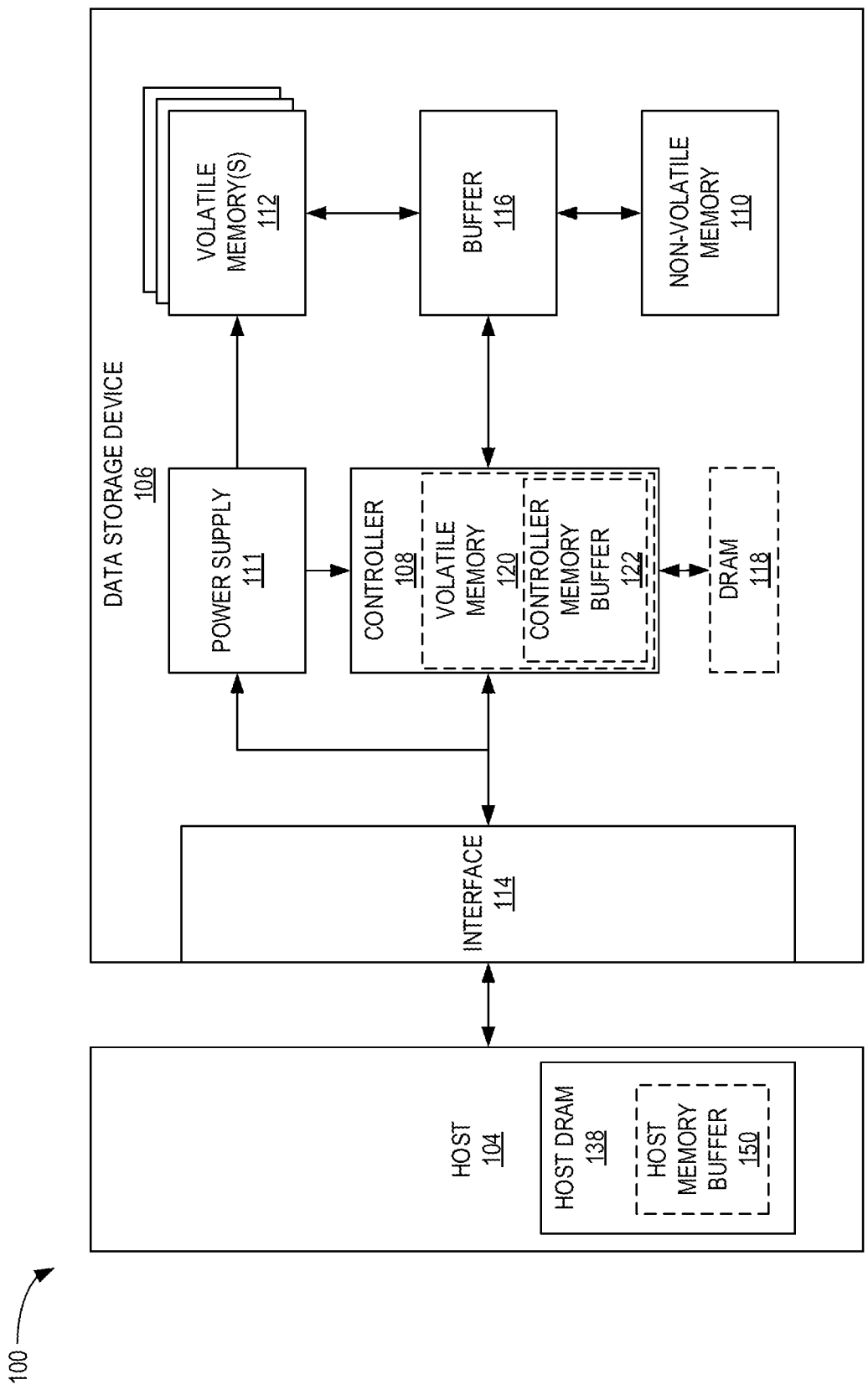
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols:

advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
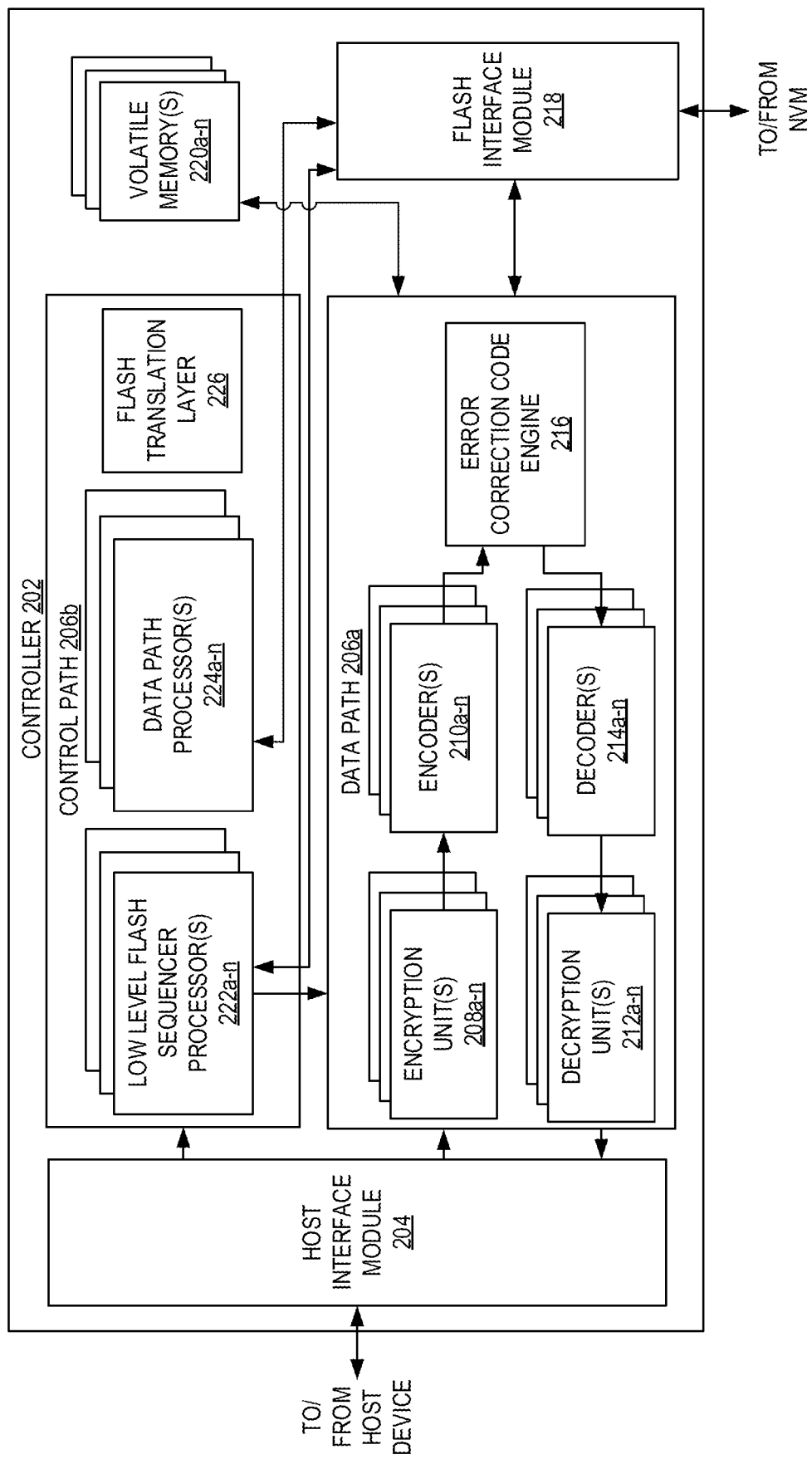
FIG. 2 is a schematic block diagram of a controller, according to certain embodiments.

FIG. 2 is a schematic block diagram of a controller 202, according to certain embodiments. The controller 202 may be the controller 108 of FIG. 1. The controller 202 includes a host interface module (HIM) 204, a data path 206a, a control path 206b, a plurality of volatile memories 220a-n, and a flash interface module (FIM) 218. The HIM 204 may receive data from and transfer data to a host device, such as the host device 104 of FIG. 1, and the FIM 218 may be configured to access a non-volatile memory, such as the NVM 110 of FIG. 1, such that data may be programmed to the NVM 110 by the controller 202 or read from the NVM 110 by the controller 202.

The data path 206a includes one or more encryption units 208a-n, one or more encoders 210a-n, one or more decryption units 212a-n, one or more decoders 214a-n, and an error correction code (ECC) engine 216. In some examples, one or more may be a plurality. When data is received by the controller 202, the data is encrypted by one of the one or more encryption units 208a-n and encoded by one of the one or more encoders 210a-210n. The encoded data, which also may be the data prior to encoding and encrypting, is provided to the ECC engine 216, where the ECC engine 216 is configured to generate ECC data for the data. The encrypting, encoding, and generating of ECC data may be completed in order to further protect the data and decrease the likelihood that the data accumulates errors. The data is then passed to the FIM 218, where the FIM 218 accesses the NVM 110 and programs the data to the relevant location of the NVM 110. In some examples, the data, processed or unprocessed, may be temporarily stored in one of the one or more volatile memories 220a-n.

The control path 206b includes a plurality of low level flash sequencer (LLFS) processors 222a-n, a plurality of data path processors 224a-n, and a flash translation layer (FTL) 226. In some examples, the FTL 226 may be external to the controller 202. The FTL 226 may be configured to perform logical-to-physical address translation, garbage collection, wear-leveling, error correction code (ECC), bad block management, and the like. Likewise, the FTL 226 may be configured to manage where requests/commands are sent to be processed. The plurality of LLFS processors 222a-n are each configured to generate commands based on received commands from the host device 104. In some examples, each LLFS processor of the plurality of LLFS processors 222a-n has its own queue or may manage a separate queue per die associated with a respective LLFS processor of the plurality of LLFS processors 222a-n. The plurality of data path processors 224a-n are each configured to track a state of the flash (e.g., a respective die of the NVM 110), such that a data path processor 224a-n may determine whether a die is full and closed, empty and closed, empty and open, reset, and the like, and/or whether the die is currently being programmed to or read from.

In the controller 202, bottlenecks (i.e., an area where flow of data or commands may be limited) may occur in any hardware module or transfer link (e.g., a bus) between hardware modules. It is to be understood that the described embodiments may be applicable to a data storage device as a whole and not specifically to the controller 202 itself. For example, the power supply 111 may be a bottleneck. Table 1 below is an example showing bottlenecks, ways to identify the bottlenecks, and ways to release the bottlenecks.

TABLE 1

| BOTTLENECK | WAYS TO IDENTIFY | WAYS TO RELEASE BOTTLENECK |
|---|---|---|
| Too many messages in data path processor input queue | 1. Read FIFO full indication 2. Check if number of messages in input queue of data path processor is above a threshold (e.g., 16 messages) | 1. Increase data path processor clock dynamically 2. Inform FTL that the data path processor is busy, where the FTL sends the next request to another data path processor that is not busy |
| Too many messages in LLFS processor input queue | 1. Read FIFO full indication 2. Check if number of messages in input queue of LLFS processor is above a threshold (e.g., 16 messages) | 1. Increase LLFS processor clock dynamically 2. Inform FTL that the LLFS processor is busy, where the FTL sends the next request to another LLFS processor that is not busy |
| Power module is unable to supply the needed power of current requests | 1. Read register that accumulates the amount of power currently consumed by the data storage device and check if the amount of power is above a power threshold | 1. Activate read and write methods that are less power consuming (e.g., programming with a lower number of program loop cycles, using a lower powered decoder, and the like) |
| RAM needed is at capacity | 1. Track usage of each RAM 2. Track a percent fullness of each RAM | 1. Allocate a different RAM type |

TABLE 1-continued

| BOTTLENECK | WAYS TO IDENTIFY | WAYS TO RELEASE BOTTLENECK |
|---|---|---|
| Insufficient RAM in the data/control path | 1. Firmware tries to allocate RAM and the allocation fails 2. Track a percent fullness of the RAMs | 1. Allocate RAM from a different processor and/or data/control path 2. Utilize non-volatile memory to store data associated with data to be stored in the RAM having insufficient space |

Figure 3:
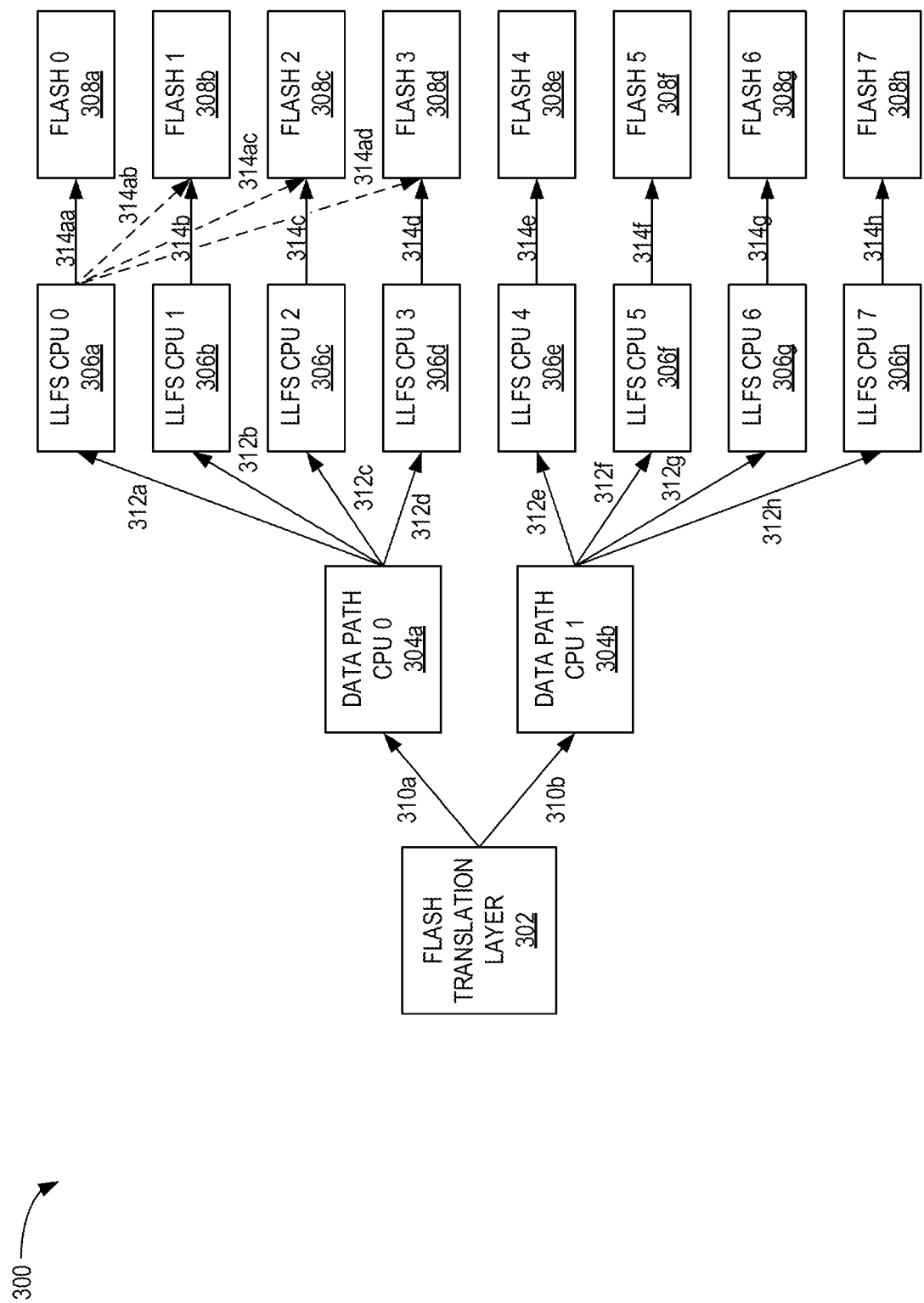
FIG. 3 is an illustrative example of a data/control path, according to certain embodiments.

FIG. 3 is an illustrative example of a data/control path 300, according to certain embodiments. Data/control path 300 includes an FTL 302, a first data path central processing unit (CPU) 304a, a second data path CPU 304b, a plurality of LLFS CPUs 306a-h, and a plurality of flash units 308a-h. The data path CPUs 304a-b may be the plurality of data path processors 224a-n of FIG. 2 and the LLFS CPUs 306a-h may be the plurality of LLFS processors 222a-n of FIG. 2. Furthermore, the FTL 302 may be the FTL 226 of FIG. 2 and the plurality of flash units 308a-h may be different or the same memory architectures of a NVM, such as the NVM 110 of FIG. 1. For example, the plurality of flash units 308a-h may each be a die of the NVM 110, a set of dies of the NVM 110, a block of the NVM 110, a zone of the NVM 110, a superblock of the NVM 110, or the like.

The FTL 302 is coupled to the first data path CPU 0 304a via a first, first bus 310a and to the second data path CPU 1 304b via a first, second bus 310b. The first data path CPU 304a is coupled to the first LLFS CPU 0 306a via a second, first bus 312a, to the second LLFS CPU 1 306b via a second, second bus 312b, to the third LLFS CPU 2 306c via a second, third bus 312c, and to the fourth LLFS CPU 3 306d via a second, fourth bus 312d. Likewise, the second data path CPU 1 304b is coupled to the fifth LLFS CPU 4 306e via a second, fifth bus 312e, to the sixth LLFS CPU 5 306f via a second, sixth bus 312f, to the seventh LLFS CPU 6 306g via a second, seventh bus 312g, and to the eighth LLFS CPU 7 306h via a second, eighth bus 312h.

Each of the LLFS CPUs are coupled to and is able to generate commands for a respective flash unit. For example, the first LLFS CPU 0 306a is coupled to the first flash unit 0 308a via a third, first, first bus 314aa, the second LLFS CPU 1 306b is coupled to the second flash unit 1 308b via a third, second bus 314b, the third LLFS CPU 2 306c is coupled to the third flash unit 2 308c via a third, third bus 314c, the fourth LLFS CPU 3 306d is coupled to the fourth flash unit 3 308d via a third, fourth bus 314d, the fifth LLFS CPU 4 306e is coupled to the fifth flash unit 4 308e via a third, fifth bus 314e, the sixth LLFS CPU 5 306f is coupled to the sixth flash unit 5 308f via a third, sixth bus 314f, the seventh LLFS CPU 6 306g is coupled to the seventh flash unit 6 308g via a third, seventh bus 314g, and the eighth LLFS CPU 7 306h is coupled to the eighth flash unit 7 308h via a third, eighth bus 314h. In some examples, each LLFS CPU may be coupled to and may be able to generate commands for a respective one or more other flash units of a same data path CPU. For example, the first LLFS CPU 0 306a is coupled to the first flash unit 0 308a via the third, first, first bus 314aa, the second flash unit 1 308b via a third, first, second bus 314ab, the second flash unit 2 308c via a third, first, third bus 314ac, and the fourth flash unit 3 308d via a third, first, fourth bus 314ad. It is to be understood that the other LLFS CPUs are coupled similarly to the relevant flash units as the first LLFS CPU 0 306a to the respective flash units.

During data storage device operation, a bottleneck may occur in any hardware module. For example, a bottleneck may occur in the FTL 302, the first data path CPU 304a, the second data path CPU 304b, one or more of the plurality of LLFS CPUs 306a-h, and one or more of the plurality of flash units 308a-h. For example, the bottleneck may occur due to a capacity of the respective hardware module exceeding at least a threshold capacity, where the threshold capacity may be a less than the capacity or up to the capacity. Likewise, the bottleneck may occur due to the number of commands being processed by the relevant hardware module reaching or exceeding a threshold number of commands that can be processed by the hardware module at a certain point in time. For example, the first data path CPU 0 304a may be busy transferring a first command and/or data of the first command to the first LLFS CPU 0 306a, where sending an additional command and/or data of the additional command to the first LLFS CPU 0 306a may result in a delay in the sending.

When a bottleneck occurs in one of the plurality of paths between the FTL 302 and a flash unit of the plurality of flash units 308a-h, a controller, such as the controller 202, may determine to release a bottleneck by performing a predetermined operation, where the hardware modules are disposed in the controller. For example, an equivalent hardware module may be used to process the command and/or data associated with the command. For example, the equivalent hardware module may be selected based on an availability of resources of the equivalent hardware module, an availability of memory of the equivalent hardware module, and a clock of the equivalent hardware module. It is to be understood that the controller 202 may manage and release bottlenecks for other hardware modules external to the controller 202. Examples of operations to release bottlenecks may be described in Table 1 above. Furthermore, when a particular bottleneck no longer exists, the controller 202 may restore the values of that were changed based on the bottleneck release operation back to default values (e.g., returning an increased clock cycle to a default clock cycle or allowing data to be sent to a hardware module that was once avoided due to the existing bottleneck).

For example, if an input queue of the first data path CPU 0 304a is at capacity or above a threshold associated with the input queue of the first data path 0 304a (e.g., first-in first-out indication), then the controller 202 may either increase a clock of the first data path CPU 0 304a or inform the FTL 302 to send the relevant command and/or data to another data path CPU, such as the second data path CPU 1 304b. When the command and/or data is sent to another data path CPU, such that the final programming location is a different flash unit than the original flash unit, the FTL 302 may manage the mapping by updating pointers, relevant mapping tables, and the like. Likewise, when the first, first bus 310a is at capacity (e.g., the first, first bus 310a can transfer up to x mb/s, where "x" is an appropriate value), then the controller 202 may inform the FTL 302 to send the relevant command and/or data to another data path CPU, such as the second data path CPU 1 304b, using a different transfer link, such as the first, second bus 310b.

In some examples, the controller 202 may pre-emptively employ a bottleneck release operation based on an expected bottleneck occurring. Furthermore, when multiple bottlenecks are identified between the FTL 302 and a respective flash unit, the controller 202 may perform one or more bottleneck release operations. For example, if a command and/or data associated with the command is directed to the third flash unit 2 308c and a bottleneck is occurring in the first data path CPU 0 304a and in the third LLFS CPU 2 306c, then the controller 202 may determine to increase a clock cycle of the first data path CPU 0 304a in order to increase a processing speed of the first data path CPU 0 304a and utilize the second LLFS CPU 1 306b to program to a different flash unit, such as the second flash unit 1 308b. In some examples, if the data is to be programmed to the first flash unit 0 308a by the first LLFS CPU 0 306a and the first flash unit 0 308a is at capacity, the first LLFS CPU 0 306a may program the data to an appropriate flash unit that is also coupled to the first LLFS CPU 0 306a. For example, the appropriate flash unit may be the second flash unit 1 308b, the third flash unit 2 308c, or the fourth flash unit 3 308d.

Figure 4:
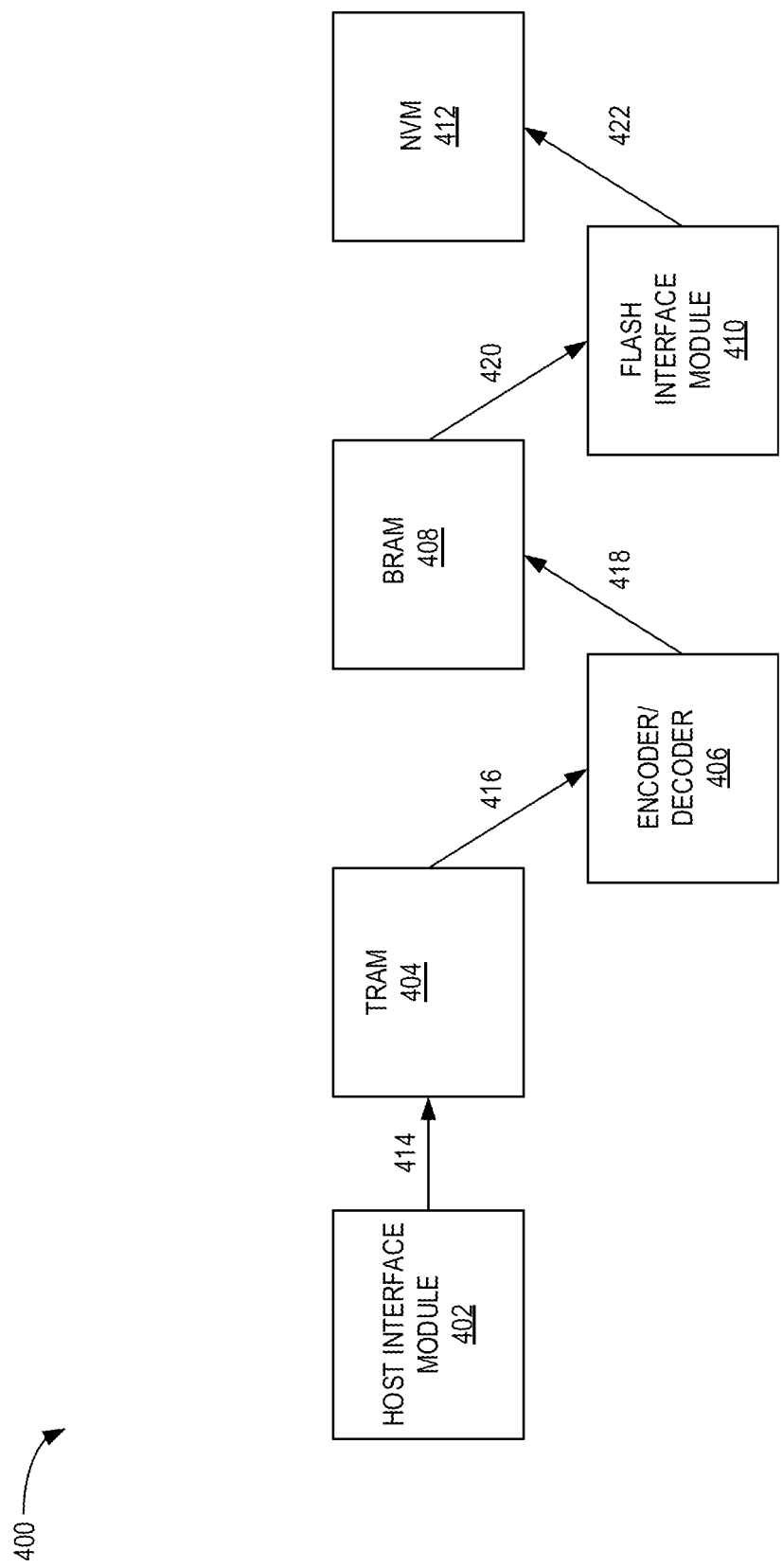
FIG. 4 is an illustrative example of a data/control path, according to certain embodiments.

FIG. 4 is an illustrative example of a data/control path 400, according to certain embodiments. The data/control path 400 includes a HIM 402 coupled to a TRAM 404 via a first bus 414, an encoder/decoder unit 406 coupled to the TRAM 404 via a second bus 416, a BRAM 408 coupled to the encoder/decoder unit 406 via a third bus 418, a FIM 410 coupled to the BRAM 408 via a fourth bus 420, and an NVM coupled to the FIM 410 via a fifth bus 422. The TRAM 404 and the BRAM 408 may each be one or more of the plurality of volatile memories 220a-n of FIG. 2 or the plurality of volatile memories 112 of FIG. 1.

Data and commands are passed from the HIM 402 to the TRAM 404 via the first bus 414. The TRAM 404 may be a large memory of the controller 202, where data of write commands and read commands are stored in the TRAM 404 prior to encoding write data or after decoding read data. The data is transferred from the TRAM 404 to the encoder/decoder unit 406 via the second bus 416, where write data is encoded by the encoder of the encoder/decoder unit 406 and read data is decoded by the decoder of the encoder/decoder unit 406. After encoding the data, the encoded data is transferred to the BRAM 408 via the third bus 418 and stored in the BRAM 408. The encoded data is then transferred from the BRAM 408 to the FIM 410 via the fourth bus 420 and programmed to the NVM 412 from the FIM 410 via the fifth bus 422.

A bottleneck may occur in any of the hardware modules of the data/control path 400. For example, if the TRAM 404 is at a threshold capacity (or exceeding the threshold capacity) or does not have enough available space to store the data needing to be stored in the TRAM 404, (which may be based on a percentage fullness of the relevant RAM or memory), the controller 202 may determine to use a different RAM, such as BRAM (which may be BRAM 408), XRAM, ARAM, MRAM, and the like, that does not have a bottleneck occurring. BRAM, XRAM, ARAM, MRAM, and the like may be different types of SRAM, in some examples. For example, the controller 202 may determine to utilize any of the one or more volatile memories 220a-n of FIG. 2. Typically, the different types of RAM may be used for specific operations. However, the controller 202 may re-allocate a RAM for a different operation when a different RAM is needed. For example, if the BRAM 408 is typically used to store encoded data prior to sending the data to the FIM 410, then the controller 202 may re-allocate (i.e., use) part of the BRAM 408 to store data of a write command prior to encoding the data.

Likewise, if an encoder of the encoder/decoder unit 406 is busy, the controller 202 may provide the data to a different encoder of the encoder/decoder unit 406 to bypass the bottleneck. In another example, if a power supply, such as the power supply 111 of FIG. 1, is unable to supply the needed power to process the current requests, the controller 202 may determine to program write data to the NVM 412 using less program loop cycles (e.g., 1 program loop cycle=program pulse+sense operation), where less program loop cycles refers to using one or more less program loop cycles than normal to program the data to the NVM 412. The number of program loop cycles to decrease the total number of program loop cycles may be based on a confidence level that errors accumulated may be corrected. Likewise, in a decoding operation, the controller 202 may determine to utilize a lower powered decoder when the power supply 111 is unable to supply the needed power to process the current requests.

Figure 5:
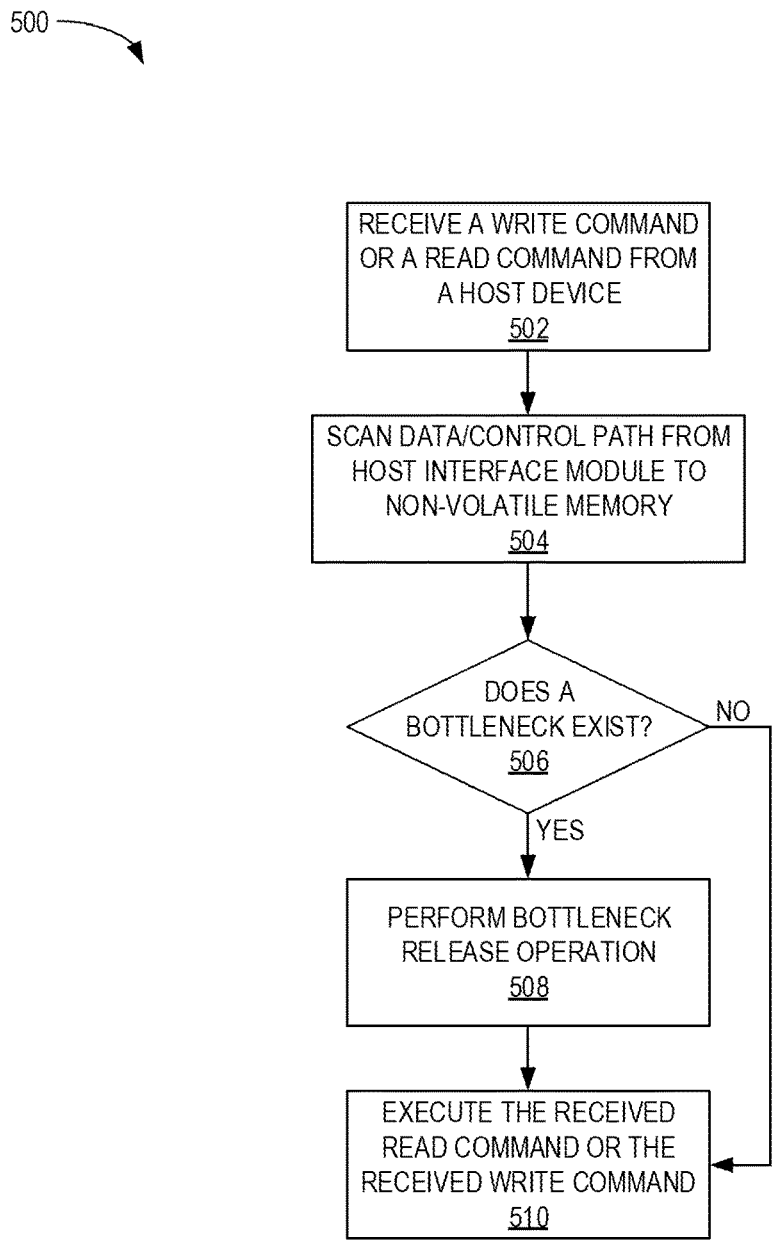
FIG. 5 is a flow diagram illustrating a method of detecting and releasing bottlenecks, according to certain embodiments.

FIG. 5 is a flow diagram illustrating a method 500 of detecting and releasing bottlenecks, according to certain embodiments. Method 500 may be implemented by a controller, such as the controller 202 of FIG. 2. For exemplary purposes, aspects of the data/control path 300 of FIG. 3 and the data/control path 400 of FIG. 4 may be referenced herein.

At block 502, the controller 202 receives a write command or a read command from a host device, which may be the host device 104 of FIG. 1. The controller 202 scans a data/control path at block 504, such as the data/control path 300 or the data/control path 400, from the HIM 204 to an NVM, such as the NVM 412 or the plurality of flash units 308a-h, for any bottlenecks that are occurring or may occur. For example, the scanning may determine whether a hardware module in the data/control path has a bottleneck occurring. In some embodiments, the controller 202 may scan the relevant hardware modules associated with processing the write command or the read command. At block 506, the controller 202 determines if a bottleneck exists in the data/control path. If a bottleneck exists at block 506, the controller 202 performs a predetermined bottleneck release operation, such as the predetermined bottleneck release operations described in Table 1 above, at block 508. At block 510, the controller 108 executes the received read command or the received write command. The executing may be based on the predetermined bottleneck release operation if a bottleneck was identified at block 506 or executed as normal if a bottleneck was not found at block 506.

Figure 6:
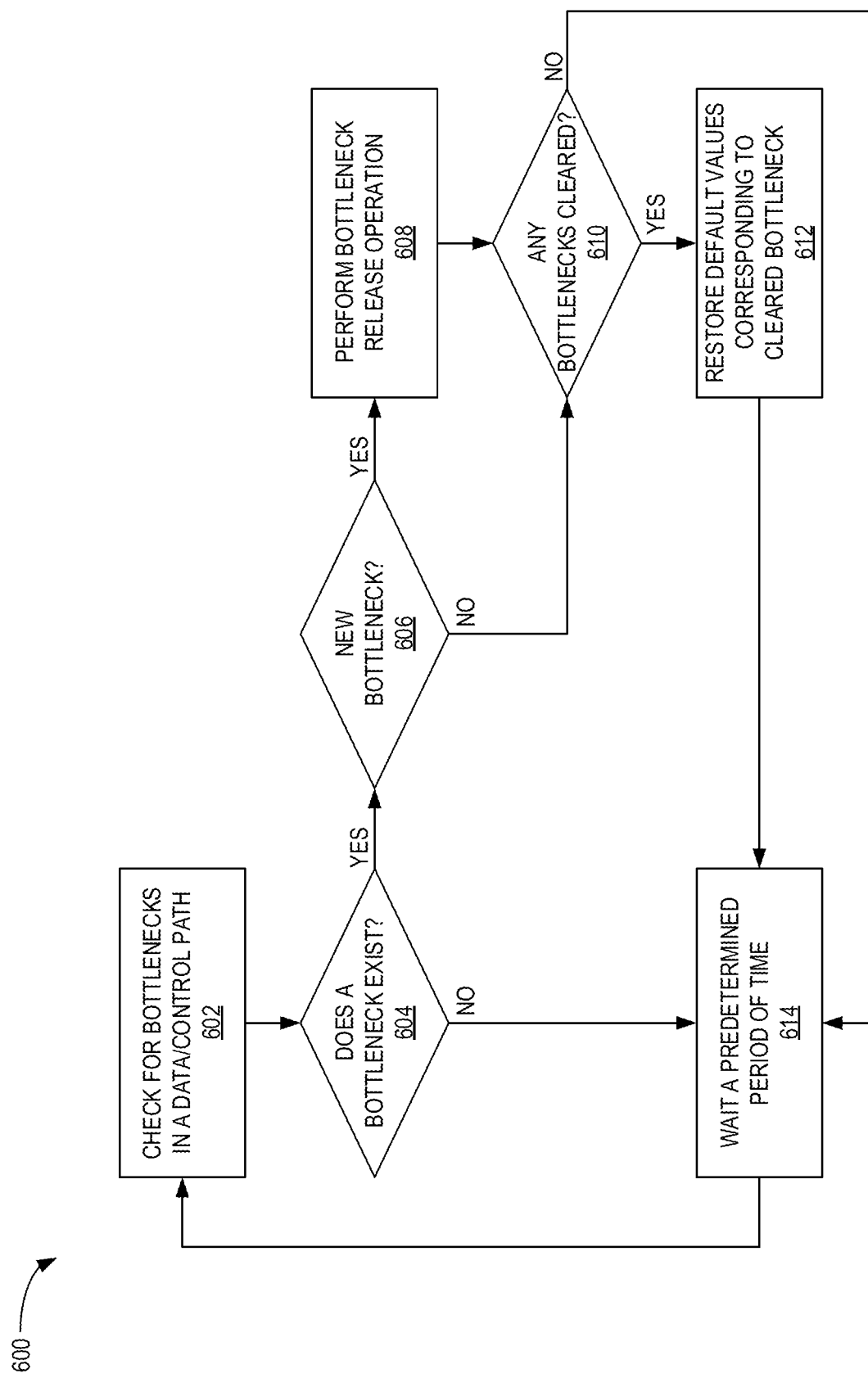
FIG. 6 is a flow diagram illustrating a method of releasing bottlenecks and restoring values associated with released bottlenecks, according to certain embodiments.

FIG. 6 is a flow diagram illustrating a method 600 of releasing bottlenecks and restoring values associated with released bottlenecks, according to certain embodiments. Method 600 may be implemented by a controller, such as the controller 202 of FIG. 2. For exemplary purposes, aspects of the data/control path 300 of FIG. 3 and the data/control path 400 of FIG. 4 may be referenced herein.

At block 602, the controller 202 checks for any bottlenecks in a data/control path, such as the data/control path 300 or the data/control path 400, from the HIM 204 to an NVM, such as the NVM 412 or the plurality of flash units 308a-h. At block 604, the controller 202 determines if a bottleneck exists. If there are no bottlenecks in the data/control path, then the controller 202 waits a predetermined period of time at block 614. The predetermined period of time may be about 50 ms to about 1 second. It is to be understood that "about" may refer to an approximate value, where values plus or minus 5% may be applicable. It is to be further understood that the predetermined period of time is not intended to be limiting, but to provide an example of a possible embodiment. After the predetermined period of time has elapsed, method 600 returns to block 602.

However, if there is a bottleneck in the data/control path at block 604, then the controller 202 determines if the bottleneck found is a new bottleneck at block 606. If the bottleneck is a new bottleneck at block 606, then the controller 202 performs the relevant bottleneck release operation to release the bottleneck at block 608. However, if the bottleneck is not a new bottleneck (e.g., an existing bottleneck that has not been cleared, but the controller 202 has already performed a bottleneck release operation based on the existing bottleneck) at block 606 or after the relevant bottleneck release operation has been executed at block 608, then the controller 202 determines if there are any bottlenecks cleared (e.g., an existing bottleneck that has been cleared, where the controller 202 has already performed a bottleneck release operation based on the existing bottleneck) at block 610.

If there are any bottlenecks cleared at block 610, then the controller 202 restores the default values corresponding to the hardware module or the transfer link associated with the cleared bottleneck at block 612. After restoring the default values at block 612 or if there are no bottlenecks cleared at block 610, the controller 202 waits a predetermined period of time at block 614. The predetermined period of time may be about 50 ms to about 1 second. It is to be understood that "about" may refer to an approximate value, where values plus or minus 5% may be applicable. It is to be further understood that the predetermined period of time is not intended to be limiting, but to provide an example of a possible embodiment. After the predetermined period of time has elapsed, method 600 returns to block 602.

By identifying hardware module bottlenecks in a data/control path and performing bottleneck release operations for the identified hardware module bottlenecks, the performance of the data storage device may be improved.

In one embodiment, a data storage device includes a first hardware module, a second hardware module coupled to the first hardware module, a third hardware module coupled to the first hardware module, and a controller coupled to the first hardware module, the second hardware module, and the third hardware module. The controller is configured to receive a command, wherein contents of the command are scheduled to be transferred to the second hardware module from the first hardware module, detect that the second hardware module has a bottleneck occurring, change the transfer location of the command from the second hardware module to the third hardware module, wherein changing the transfer location causes the contents of the command to be scheduled to be transferred to third hardware module from the first hardware module, and transfer the command from the first hardware module to the third hardware module.

The second hardware module and the third hardware module are different types of random access memories. The second hardware module and the third hardware module are a same type of hardware module. The bottleneck corresponds to the second hardware module not receiving a minimum amount of power required to complete pending commands in the second hardware module. The detecting includes reading a first-in first-out (FIFO) full indication corresponding to the second hardware module. The FIFO full indication indicates that a number of pending commands in the second hardware module equals or exceeds a threshold number of pending commands of the second hardware module. The detecting includes determining that a usage of the second hardware module equals or exceeds a threshold usage of the second hardware module. The detecting comprises determining that an allocation of the second hardware module for the command has failed. The controller is further configured to update a mapping associated with the command. The updated mapping indicates a new mapping corresponding to a location different than an original location associated with the command in the data storage device. The controller is further configured to receive another command, wherein contents of the another command are scheduled to be transferred to the second hardware module from the first hardware module, determine that the bottleneck of the second hardware module is released, and transfer the another command from the first hardware module to the second hardware module.

In another embodiment, a data storage device includes a first hardware module, a second hardware module coupled to the first hardware module, a third hardware module coupled to the first hardware module, and a controller coupled to the first hardware module, the second hardware module, and the third hardware module. The controller is configured to receive a command, wherein contents of the command are scheduled to be transferred to the second hardware module from the first hardware module, detect that the second hardware module has a bottleneck occurring, adjust an operating parameter of the second hardware module in response to the bottleneck, and transfer the command from the first hardware module to the second hardware module.

The operating parameter is a clock of the second hardware module. The adjusting includes increasing the clock of the second hardware module. The increased clock of the second hardware module is reverted to an original clock setting when the bottleneck is released. The second hardware module is either a data path central processing unit (CPU), a low level flash sequence (LLFS) CPU, or a flash unit of a memory device of the data storage device. The controller is further configured to receive another command, change a transfer location of the another command from the second hardware module to the third hardware module, wherein changing the transfer location causes contents of the another command to be scheduled to be transferred to third hardware module from the first hardware module and the bottleneck of the second hardware module is not released, and transfer the command from the first hardware module to the third hardware module. The controller is further configured to update a mapping associated with the another command. The mapping is updated with the transfer location of the another command. The operating parameter is a number of program erase cycles. The adjusting includes decreasing a number of program erase cycles associated with the command. The operating parameter is a decoding or encoding strength. The adjusting comprises decreasing an amount of decoding strength or encoding strength associated with the command.

In another embodiment, a data storage device includes memory means and a controller coupled to the memory means. The controller is configured to receive a write command to write data to the memory means or a read command to read data from the memory means, determine that there is a bottleneck in a hardware module in a data/control path between a first hardware module and the memory means, wherein the data/control path comprises at least the first hardware module and a plurality of second hardware modules and each second hardware module of the plurality of second hardware modules are coupled to the first hardware module, perform a bottleneck release operation associated with the bottleneck in the hardware module, and execute the write command or the read command based on the bottleneck release operation performed.

The bottleneck release operation includes one or more of transferring the write command or read command to a different hardware module, wherein the different hardware module is a same type of hardware module as the hardware module and changing an operation parameter of the hardware module. Changing the operation parameter includes either increasing a clock of the hardware module or decreasing an amount of decoding strength associated with the read command or encoding strength associated with write command.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a first hardware module;
   a second hardware module coupled to the first hardware module;
   a third hardware module coupled to the first hardware module; and
   a controller coupled to the first hardware module, the second hardware module, and the third hardware module, wherein the controller is configured to:
   receive a command, wherein contents of the command are scheduled to be transferred to the second hardware module from the first hardware module;
   detect that the second hardware module has a bottleneck occurring;
   change a transfer location of the command from the second hardware module to the third hardware module, wherein changing the transfer location causes the contents of the command to be scheduled to be transferred to third hardware module from the first hardware module; and
   transfer the command from the first hardware module to the third hardware module.

2. The data storage device of claim 1, wherein the second hardware module and the third hardware module are different types of random access memories.

3. The data storage device of claim 1, wherein the second hardware module and the third hardware module are a same type of hardware module.

4. The data storage device of claim 1, wherein the bottleneck corresponds to the second hardware module not receiving a minimum amount of power required to complete pending commands in the second hardware module.

5. The data storage device of claim 1, wherein the detecting comprises reading a first-in first-out (FIFO) full indication corresponding to the second hardware module.

6. The data storage device of claim 5, wherein the FIFO full indication indicates that a number of pending commands in the second hardware module equals or exceeds a threshold number of pending commands of the second hardware module.

7. The data storage device of claim 1, wherein the detecting comprises determining that a usage of the second hardware module equals or exceeds a threshold usage of the second hardware module.

8. The data storage device of claim 1, wherein the detecting comprises determining that an allocation of the second hardware module for the command has failed.

9. The data storage device of claim 1, wherein the controller is further configured to update a mapping associated with the command, and wherein the updated mapping indicates a new mapping corresponding to a location different than an original location associated with the command in the data storage device.

10. The data storage device of claim 1, wherein the controller is further configured to:
    receive another command, wherein contents of the another command are scheduled to be transferred to the second hardware module from the first hardware module;
    determine that the bottleneck of the second hardware module is released; and
    transfer the another command from the first hardware module to the second hardware module.

11. A data storage device, comprising:
    memory means; and
    a controller coupled to the memory means, wherein the controller is configured to:
    receive a write command to write data to the memory means or a read command to read data from the memory means;
    determine that there is a bottleneck in a hardware module in a data/control path between a first hardware module and the memory means, wherein:
    the data/control path comprises at least the first hardware module and a plurality of second hardware modules; and
    each second hardware module of the plurality of second hardware modules are coupled to the first hardware module;
    perform a bottleneck release operation associated with the bottleneck in the hardware module; and
    execute the write command or the read command based on the bottleneck release operation performed.

12. The data storage device of claim 11, wherein the bottleneck release operation comprises one or more of:
    transferring the write command or read command to a different hardware module, wherein the different hardware module is a same type of hardware module as the hardware module; and
    changing an operation parameter of the hardware module, wherein changing the operation parameter comprises either:
    increasing a clock of the hardware module; or
    decreasing an amount of decoding strength associated with the read command or encoding strength associated with write command.

* * * * *